US012760221B2

(12) United States Patent
Nam et al.

(10) Patent No.: US 12,760,221 B2
(45) Date of Patent: Oct. 13, 2026

(54) QUANTUM DOTS AND MANUFACTURING METHOD THEREOF

(71) Applicant: Samsung Display Co., LTD., Yongin-si (KR)

(72) Inventors: Juo Nam, Yongin-si (KR); Jungho Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/464,970

(22) Filed: Sep. 11, 2023

(65) Prior Publication Data

US 2024/0124771 A1 Apr. 18, 2024

(30) Foreign Application Priority Data

Oct. 14, 2022 (KR) ........................ 10-2022-0132567

(51) Int. Cl.
*C09K 11/62* (2006.01)
*C09K 11/02* (2006.01)
*C09K 11/06* (2006.01)

(52) U.S. Cl.
CPC ............ *C09K 11/621* (2013.01); *C09K 11/02* (2013.01); *C09K 11/06* (2013.01)

(58) Field of Classification Search
CPC ....... C09K 11/02; C09K 11/06; C09K 11/025; C09K 11/562; C09K 11/582; C09K 11/621
USPC ....................................................... 252/519.2
See application file for complete search history.

(56) References Cited

U.S. PATENT DOCUMENTS

2020/0266348 A1* 8/2020 Kim ..................... H10K 85/115

FOREIGN PATENT DOCUMENTS

| | | | | |
|---|---|---|---|---|
| JP | 2019151832 | A | * | 9/2019 |
| KR | 10-1641016 | B1 | | 7/2016 |
| KR | 10-2017-0097825 | A | | 8/2017 |
| KR | 10-2018-0059363 | A | | 6/2018 |
| KR | 10-2019-0026211 | A | | 3/2019 |
| KR | 10-2020-0099930 | A | | 8/2020 |
| KR | 10-2021-0041373 | A | | 4/2021 |
| KR | 10-2021-0102841 | A | | 8/2021 |
| KR | 10-2348540 | B1 | | 1/2022 |
| KR | 20230113080 | A | * | 7/2023 |

OTHER PUBLICATIONS

Kirkwood Finding and Fixing Traps in II-VI and III-V Colloidal Quantum Dots: The Importance of Z-Type Ligand Passivation J. Am. Chem. Soc. 2018, 140, 1571 (Year: 2018).*
Translation of JP-2019151832-A (Year: 2025).*

(Continued)

*Primary Examiner* — Tri V Nguyen
(74) *Attorney, Agent, or Firm* — Womble Bond Dickinson (US) LLP

(57) ABSTRACT

A quantum dot according to one or more embodiments includes: a core; a shell around the core; and a first passivation layer and a second passivation layer around the shell, wherein the first passivation layer includes a metal oxide, the second passivation layer includes a compound represented by $K'(OA')_n$, and K' is one selected from among In, Zn, Ga, Mg, while n is 2 or 3. A' is selected from among Ac, H, i-Pr (isopropyl), and Bu (butyl).

9 Claims, 7 Drawing Sheets

(56) References Cited

OTHER PUBLICATIONS

Translation of KR20230113080A (Year: 2025).*
Jo et al., Photostability enhancement of InP/ZnS quantum dots enabled by $In_2O_3$ overcoating, Journal of Alloys and Compounds 647 (2015) 6-13, pp. 1-8.
Berends et all, Optoelectronic Properties of Ternary I-III-VI2 Semiconductor Nanocrystals: Bright Prospects with Elusive Origins, The Journal of Physical Chemistry Letters 2019, 10, pp. 1600-1616.

* cited by examiner

QUANTUM DOTS AND MANUFACTURING METHOD THEREOF

CROSS-REFERENCE TO RELATED APPLICATION

This application claims priority to and the benefit of Korean Patent Application No. 10-2022-0132567, filed in the Korean Intellectual Property Office on Oct. 14, 2022, the entire content of which is incorporated herein by reference.

BACKGROUND

1. Field

Embodiments of the present disclosure relate to quantum dots and a manufacturing method thereof.

2. Description of the Related Art

Quantum dots are nano-crystals of semiconductor materials, and are materials that exhibit one or more quantum confinement effects. When the quantum dots receive light from an excitation source and reach an energy excited state, they emit energy according to a corresponding energy band gap. Here, even in the case of the same material, because a quantum dot has the characteristic that the wavelength varies depending on the particle size, by adjusting the size of the quantum dot or dots, light of a desired or suitable wavelength region may be obtained, and characteristics such as excellent or suitable color purity and high luminous efficiency may be displayed, so it may be applied to one or more suitable devices.

In some examples, quantum dots may be utilized as a material that performs one or more suitable optical functions (e.g., a light conversion function) among optical members. Quantum dots are semiconductor nano-crystals of a nano-size (e.g., in the nano-size scale), and may have different energy bandgap by controlling the size and composition of the nano-crystals, and thus can emit light of various suitable emission wavelength(s).

In order to improve the color reproducibility of display devices, the development of light-emitting devices utilizing quantum dots as light emitting materials is in progress, and it is required to improve the light emitting efficiency and lifetime of light-emitting devices utilizing quantum dots.

The above information disclosed in this Background section is only for enhancement of understanding of the background of the present disclosure, and therefore it may contain information that does not form the prior art that is already suitable in this country to a person of ordinary skill in the art.

SUMMARY

Aspects of one or more embodiments are to provide quantum dots and a manufacturing method of quantum dots with improved a light emitting efficiency and a retention rate.

Additional aspects will be set forth in part in the description which follows and, in part, will be apparent from the description, or may be learned by practice of the presented embodiments of the disclosure.

A quantum dot according to an embodiment includes a core; a shell around (e.g., surrounding) the core; and a first passivation layer and a second passivation layer around (e.g., surrounding) the shell, wherein the first passivation layer includes a metal oxide, the second passivation layer includes a compound represented by $K'(OA')_n$, and K' is one selected from among In, Zn, Ga, and Mg, and n is 2 or 3 (and A' may be selected from among Ac, H, i-Pr (isopropyl), and Bu (butyl)).

The first passivation layer may include an oxide of at least one metal selected from among In, Ga, Al, and Ti.

The core may include a compound represented by A-B—X, A is one or more selected from among Ag, Cu, and Au, B is one or more selected from among In, Ga, and Al, and X is one or more selected from among S, Se, and Te.

The shell may include a compound represented by C'—Y', C' may be one or more selected from among Ga, In, Zn, Mg, and Y' may be one or more selected of S, Se.

The core may include AgInGaS (AIGS).

The shell may include GaS.

The first passivation layer may include $In_2O_3$.

The second passivation layer may include $In(OAc)_3$.

The first passivation layer may be positioned closer to the shell than the second passivation layer is to the shell.

The second passivation layer may be positioned closer to the shell than the first passivation layer is to the shell.

A manufacturing method of a quantum dot according to an embodiment includes: forming a core; forming a shell around (e.g., surrounding) the core; forming a first passivation layer around (e.g., surrounding) the shell; and forming a second passivation layer around (e.g., surrounding) the first passivation layer, wherein the second passivation layer includes $In(OAc)_3$, and the second passivation layer is formed by a method of adding an $In(OAc)_3$ solution and heating it.

The heating in the forming of the second passivation layer is performed at (a temperature of) 180° C. for 1 hour.

The first passivation layer may include $In_2O_3$.

The forming of the first passivation layer may be performed by a method of adding at least one precursor solution selected from among $In(OAc)_3$, $In(OH)_3$, $In(i\text{-}PrO)_3$, and $In(BuO)_3$ and heating it In the forming of the first passivation layer, the heating is performed for 30 minutes at a temperature of 190° C.

The core may include AIGS (silver-indium-gallium-sulfide).

The forming of the core may be performed by a method of adding sulfur to a mixture solution comprising at least selected from among AgI, $GaI_3$, $InI_3$, OLA (Oleylamine), TOPO (Trioctylphosphine Oxide), and TOA (Trioctylamine), and heating it.

A ratio of the amount of indium included in the $In(OAc)_3$ solution to the amount of indium included in the core may be 1 to 4.

The shell may include GaS.

The shell may be formed by utilizing S-OLA (sulfur-oleylamine) and $GaCl_3$.

According to embodiments, the quantum dot with the improved light emitting efficiency and retention rate and the manufacturing method of the quantum dot may be provided.

DETAILED DESCRIPTION

Figure 1:
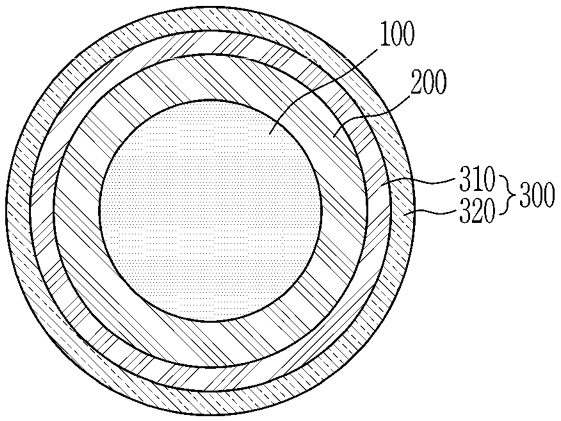
FIG. 1 is a view schematically showing a quantum dot according to an embodiment.

The present disclosure will be described more fully hereinafter with reference to the accompanying drawings, in which embodiments of the present disclosure are shown. As those skilled in the art would realize, the described embodiments may be modified in one or more suitable different ways, all without departing from the spirit or scope of the present disclosure.

In order to clarify the present disclosure, parts that are not connected with the description will not be provided, and the same elements or equivalents are referred to by the same reference numerals throughout the specification.

Further, because sizes and thicknesses of constituent members shown in the accompanying drawings are arbitrarily given for better understanding and ease of description, the present disclosure is not limited to the illustrated sizes and thicknesses. In the drawings, the thickness of layers, films, panels, regions, etc., are exaggerated for clarity. In the drawings, for better understanding and ease of description, thicknesses of some layers and areas are excessively displayed.

It will be understood that when an element such as a layer, film, region, or substrate is referred to as being "on" another element, it can be directly on the other element or intervening element(s) may also be present. In contrast, when an element is referred to as being "directly on" another element, there are no intervening elements present (exclude any intervening element). Further, in the specification, the word "on" or "above" refers to positioned on or below the object portion, and does not necessarily refer to positioned on the upper side of the object portion based on a gravitational direction.

In some embodiments, unless explicitly described to the contrary, the word "comprise", and variations such as "comprises" or "comprising", will be understood to imply the inclusion of stated elements but not the exclusion of any other elements.

Further, in the specification, the phrase "on a plane" or "in a plan view" refers to when an object portion is viewed from above, and the phrase "on a cross-section" or "in a cross-sectional view" refers to when a cross-section taken by vertically cutting an object portion is viewed from the side.

As utilized herein, the term "and/or" includes any and all combinations of one or more of the associated listed items. Throughout the disclosure, the expression "at least one of a, b or c", "at least one of a-c", "at least one of a to c", "at least one of a, b, and/or c", "at least one selected from among a, b, and c", "at least one selected from among a to c", etc., indicates only a, only b, only c, both (e.g., simultaneously) a and b, both (e.g., simultaneously) a and c, both (e.g., simultaneously) b and c, all of a, b, and c, or variations thereof.

In the present specification, "including a or b", "a and/or b", etc., represents a or b, or a and b.

As used herein, the term "substantially," "about," and similar terms are used as terms of approximation and not as terms of degree, and are intended to account for the inherent deviations in measured or calculated values that would be recognized by those of ordinary skill in the art. "About" or "substantially", as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" or "substantially" may mean within one or more standard deviations, or within ±30%, 20%, 10%, 5% of the stated value.

Then, quantum dots and a manufacturing method of quantum dots according to the present embodiment will be described in more detail with reference to drawings.

FIG. 1 is a view schematically showing a quantum dot according to an embodiment. Referring to FIG. 1, the quantum dot according to an embodiment include a core 100, a shell 200, and a passivation layer 300. In this case, the passivation layer may include a first passivation layer 310 and a second passivation layer 320.

Referring to FIG. 1, it may include a compound represented by a core 100 A-B—X of quantum dots according to the present embodiment. In this case, A may be one or more selected from among Ag, Cu, and Au, B may be one or more selected from among In, Ga, and Al, and X may be one or more selected from among S, Se, and Te. For example, the core 100 may include AgInGaS.

The shell 200 may include a compound that are included as C'-Y'. In this case, C' may be one or more selected from among Ga, In, Zn, and Mg, and Y' may be one or more selected from among S and Se. For example, the shell 200 may include GaS. In FIG. 1, the shell 200 is shown as a single layer, but according to embodiments, the shell 200 may have a multi-layered structure of two or more layers.

Next, the passivation layer 300 may include a first passivation layer 310 and a second passivation layer 320. The first passivation layer 310 may be positioned closer to the core 100 than the second passivation layer 320 is to the core. The first passivation layer 310 may include $In_2O_3$. In some embodiments, the first passivation layer 310 may include an oxide of at least one metal selected from among In, Ga, Al, and Ti.

The second passivation layer 320 may include $In(OAc)_3$. In some embodiments, the second passivation layer 320 may include a compound represented by K'(OA')n. K' is one selected from among In, Zn, Ga, and Mg, and n may be 2 or 3. A' is selected from among Ac, H, i-Pr, and Bu.

For example, the quantum dots according to the present embodiment as quantum dots of a core/shell structure are passivated with the first passivation layer of a metal oxide and the second passivation layer of an organic metal compound. In this case, the core may be a quaternary compound, for example AgInGaS. For example, the shell may be GaS, the first passivation layer may be $In_2O_3$, and the second passivation layer may be $In(OAc)_3$. For example, the quantum dots may have a $AIGS/GaS/In_2O_3/In(OAc)_3$ structure.

Quantum dots having this structure may have excellent or suitable optical/chemical/thermal stability without including cadmium.

Figure 2:
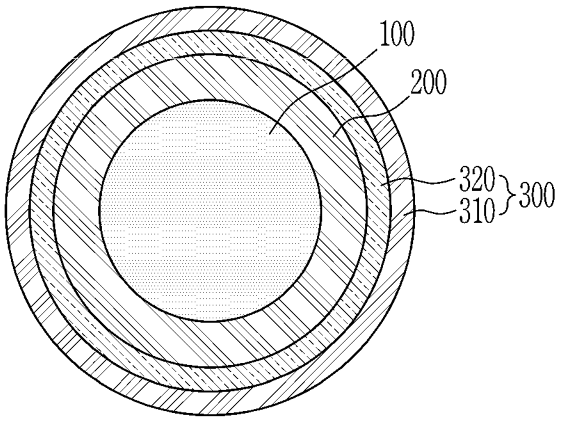
FIG. 2 is a view schematically showing a quantum dot according to an embodiment.

FIG. 1 shows an embodiment in which the layers are positioned close to the core 100 in the order of the first passivation layer 310 and the second passivation layer 320, but in another embodiment, they may be positioned close to the core 100 in the order of the second passivation layer 320 and the first passivation layer 310. FIG. 2 is a view showing a quantum dot according to an embodiment. Referring to FIG. 2, the quantum dot is formed in order of the core 100, the shell 200, the second passivation layer 320, and the first passivation layer 310. At this time, the description of (e.g., each of) the core 100, the shell 200, the second passivation layer 320, and the first passivation layer 310 is the same as that in FIG. 1 such that it is not provided again. For example, the quantum dots may have an AIGS/GaS/In(OAc)$_3$/In$_2$O$_3$ structure.

In the case of the cadmium-based quantum dots, the optical characteristics are very good or suitable, but because cadmium is a regulatory (controlled) material, it is necessary or desired to utilize other materials. AIGS (AgInGaS) of the quantum dots of an I-III-VI Group with the improved optical characteristics may be utilized instead of cadmium. However, in the case of the AgInGaS quantum dots, there is a problem in that the photo/chemical/thermal stability deteriorates compared to the quantum dots including cadmium like CdSe.

Accordingly, the quantum dots according to the present embodiment improve the photo/chemical/thermal stability of the AgInGaS quantum dots through the surface passivation. In some embodiments, both (e.g., simultaneously) efficiency (PLAY, %) and retention rate (PLQY/PLQYinit, %) could be improved by including both (e.g., simultaneously) the first passivation layer 310 and the second passivation layer 320.

Table 1 shows the results of experiments on the efficiency (PLAY, %) and the retention rate (PLQY/PLQYinit, %) for one or more suitable embodiments. The efficiency PLAY (%) refers to the ratio of the amount of light incident to the quantum dots and the amount of light emitted from the quantum dots, and the retention rate refers to the ratio between initial efficiency and efficiency after time as PLQY/PLQYinit.

In(OAc)$_3$ and the first passivation layer including In$_2$O$_3$ are sequentially formed on the quantum dots having the core/shell structure of AIGS/GaS.

Figure 3:
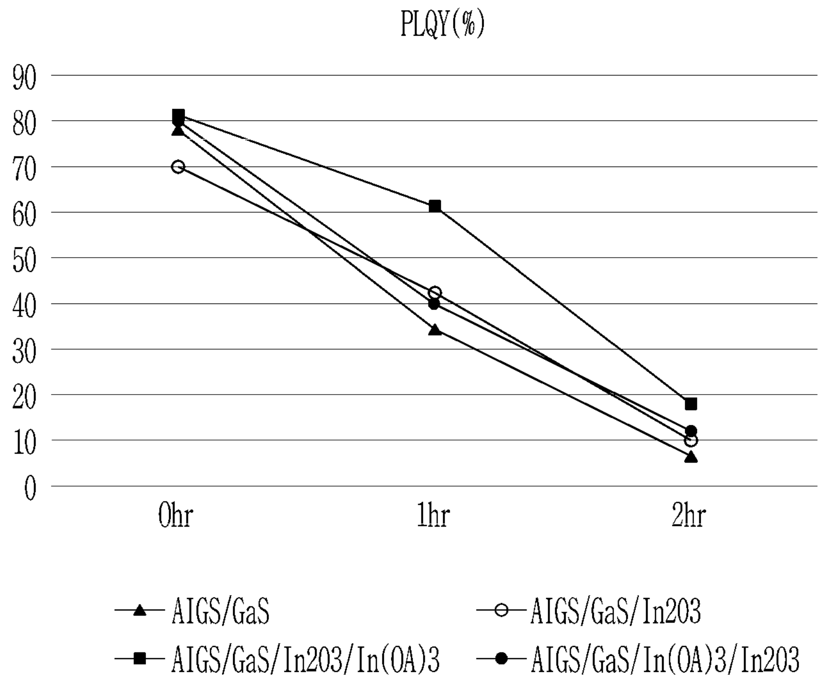
FIG. 3 is a view showing an efficiency of quantum dots according to one or more embodiments.
Figure 4:
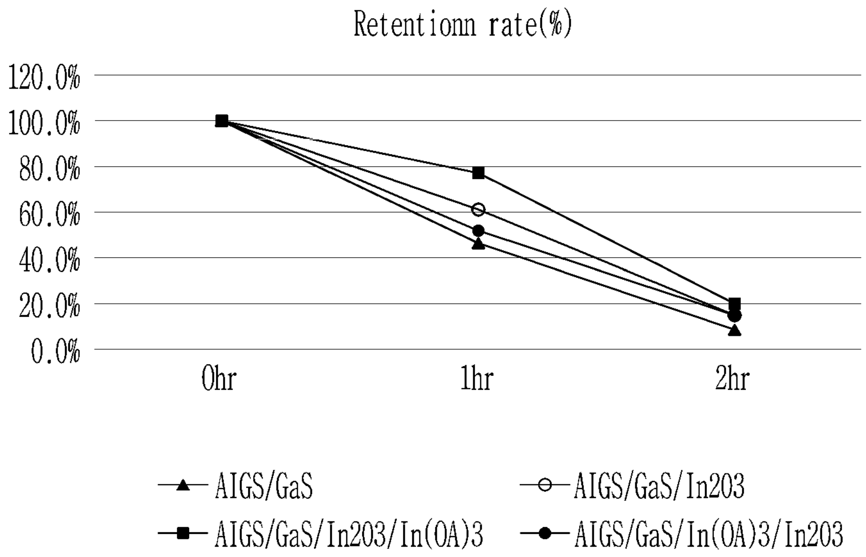
FIG. 4 is a view showing a retention rate of quantum dots according to one or more embodiments.

The results of Table 1 are shown in FIG. 3 and FIG. 4. FIG. 3 shows efficiency of the quantum dots according to one or more embodiments, and FIG. 4 shows the retention rate of the quantum dots according to one or more embodiments.

Referring to Table 1 and FIG. 3, it may be confirmed that Embodiment 3 having the AIGS/GaS/In$_2$O$_3$/In(OAc)$_3$ structure has the highest effect. Also, it may be confirmed that Embodiment 4 having the AIGS/GaS/In(OAc)$_3$/In$_2$O$_3$ structure also has high efficiency. As above-described, it may be confirmed that the quantum dots including both (e.g., simultaneously) the first passivation layer including indium oxide and the second passivation layer including an organic indium compound had excellent or suitable luminous efficiency.

Also, referring to Table 1 and FIG. 4, it may be confirmed that Embodiment 3 having the AIGS/GaS/In$_2$O$_3$/In(OAc)$_3$ structure has the best retention rate.

Now, the manufacturing method of the quantum dots according to the present embodiment will be described in more detail. Hereinafter, the quantum dots having the structure of AIGS/GaS/In$_2$O$_3$/In(OAc)$_3$ will be explained as an example.

First, AIGS Core is synthesized. At this time, the synthesis of the core may be formed by adding sulfur to a mixed solution of AgI+GaI$_3$+InI$_3$+OLA (Oleylamine)+TOPO (Trioctylphosphine Oxide)+TOA (Trioctylamine) and then heating it to a temperature of about 240° C.

Next, the synthesized AIGS core is refined.

Next, the GaS shell may be formed by utilizing S-OLA and GaCl$_3$.

Next, the In(OAc)$_3$ solution is added to the quantum dot solution and the mixture is heated to 190° C. for 30 minutes. Through this process, the first passivation layer containing In$_2$O$_3$ is formed. In the present embodiment, In(OAc)$_3$ is utilized as an In$_2$O$_3$ precursor, but one or more selected from among In(OH)$_3$, In(i-PrO)$_3$, and In(BuO)$_3$ may be utilized as the precursor.

Next, after adding the In(OAc)$_3$ solution to the quantum dot solution, the mixture is heated to 180° C. for one hour. Through this process, the second passivation layer including In(OAc)$_3$ is formed.

At this time, the ratio (In solution/In core) of the content (e.g., amount) of In included in the In(OAc)$_3$ solution to the content (e.g., amount) of In included in the core during this manufacturing process may be 1 to 4.

Table 2, for the quantum dots of AIGS/GaS/In$_2$O$_3$/In(OAc)$_3$, shows the efficiency and the retention rate by

TABLE 1

| Estimation (60 mW | Quantum dots | PLQY (%) | | | Retention rate (%, PLQY/PLQY$_{init}$) | | |
|---|---|---|---|---|---|---|---|
| Blue BLU) | component | 0 h | 1 h | 2 h | 0 h | 1 h | 2 h |
| Embodiment 1 | AIGS/GaS | 77.4 | 36.2 | 6.8 | 100.0% | 46.8% | 8.8% |
| Embodiment 2 | AIGS/GaS/In$_2$O$_3$ | 70.2 | 42.7 | 10.7 | 100.0% | 60.8% | 15.2% |
| Embodiment 3 | AIGS/GaS/In$_2$O$_3$/In(OAc)$_3$ | 81.2 | 62.3 | 15.8 | 100.0% | 76.7% | 19.5% |
| Embodiment 4 | AIGS/GaS/In(OAc)$_3$/In$_2$O$_3$ | 79.3 | 41.1 | 12.2 | 100.0% | 51.8% | 15.4% |

Embodiment 1 is the quantum dots having the core/shell of AIGS/GaS structure and does not include a passivation layer. Embodiment 2 is an embodiment in which a first passivation layer containing In$_2$O$_3$ is formed on the quantum dots having a core/shell structure of AIGS/GaS. Embodiment 3 is an embodiment in which a first passivation layer including In$_2$O$_3$ and a second passivation layer including In(OAc)$_3$ are formed on the quantum dots having a core/shell structure of AIGS/GaS. Embodiment 4 is an embodiment in which the order of the first passivation layer and the second passivation layer is changed for the passivation layer of Embodiment 3. For example, Embodiment 4 is an embodiment in which the second passivation layer including manufacturing the quantum dots while differentiating the indium content (e.g., amount) (In solution/In core) of the $In(OAc)_3$ solution.

TABLE 2

| Content of In of $In(OAc)_3$ solution (In solution/In core) | | PLQY (%) 0 h | PLQY (%) 1 h | PLQY (%) 2 h | Retention rate (%, $PLQY/PLQY_{init}$) 0 h | Retention rate 1 h | Retention rate 2 h | |
|---|---|---|---|---|---|---|---|---|
| AIGS/GaS/ $In_2O_3/In(OAc)_3$ | 1 | 72.8 | 44.6 | 12.3 | 163.2% | 100.0% | 27.6% | |
| | 2 | 75.4 | 50.2 | 13.8 | 150.2% | 100.0% | 27.5% | |
| | 3 | 81.2 | 62.3 | 15.8 | 130.3% | 100.0% | 25.4% | |
| | 4 | 81.4 | 61.8 | 15.3 | 131.7% | 100.0% | 24.8% | Optimized Point |
| | 5 | 81.6 | 62.4 | 15.7 | 130.8% | 100.0% | 25.2% | Viscosity |
| | 6 | 80.9 | 61.8 | 13.5 | 130.9% | 100.0% | 21.8% | increasing |
| | 7 | 81.6 | 61.8 | 14.5 | 132.0% | 100.0% | 23.5% | due to |
| | 8 | 83.2 | 63.3 | 12.7 | 131.4% | 100.0% | 20.1% | excess by- |
| | 9 | 82.1 | 62.1 | 13.6 | 132.2% | 100.0% | 21.9% | products and |
| | 10 | 80.4 | 61.2 | 13.8 | 131.4% | 100.0% | 22.5% | retention rate deterioration |

Referring to Table 2, when the indium content (e.g., amount) (In solution/In core) of the $In(OAc)_3$ solution is of 1 to 4, it may be confirmed that the excellent or suitable efficiency and retention rate appear, and particularly when the In solution/In core is 3, the optimized value is obtained. However, when the indium content (e.g., amount) ((In solution/In core) of the $In(OAc)_3$ solution exceeds 5, it may be confirmed that the viscosity increases and the retention rate decreases due to the excessive amount of by-products, which is undesirable.

Figure 5:
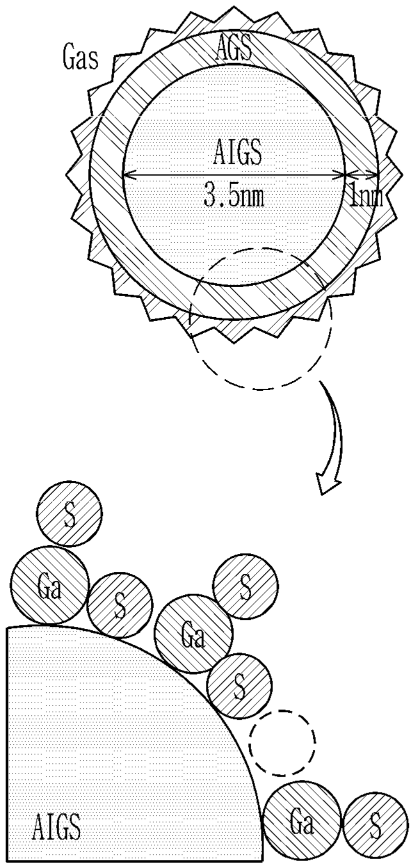
FIG. 5-7 are views illustrating a principle of improving an efficiency due to a formation of a first passivation layer and a second passivation layer for quantum dots according to an embodiment.
Figure 6:
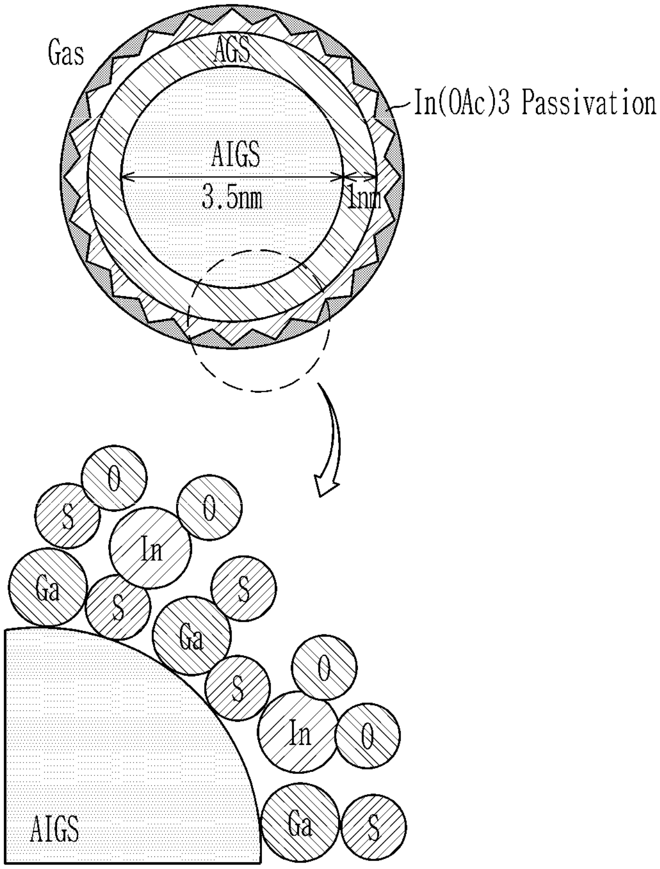
Figure 7:
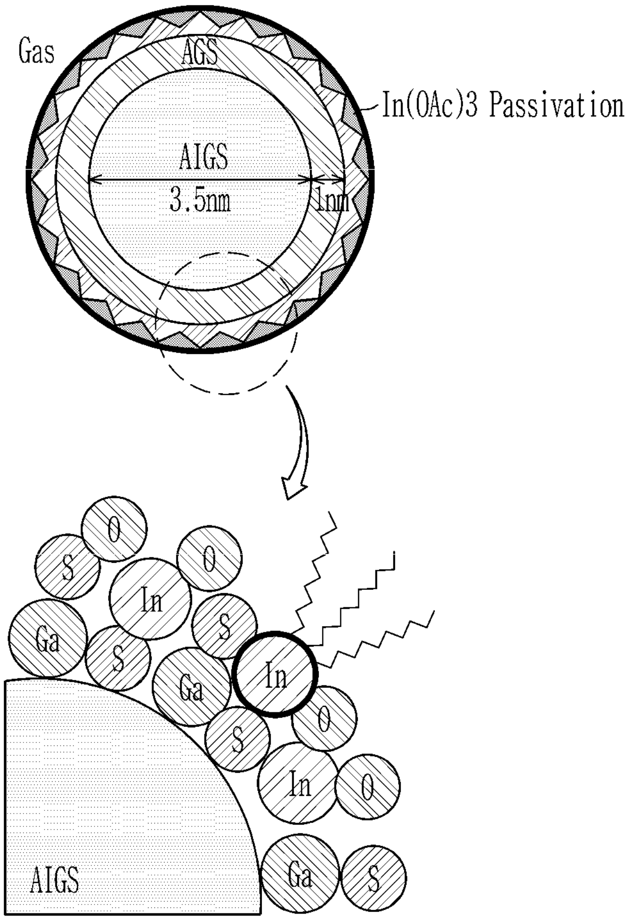

FIG. 5 to FIG. 7 are views illustrating a principle of improving efficiency due to a formation of a first passivation layer and a second passivation layer for quantum dots according to an embodiment. Referring to FIG. 5, in the case of the quantum dots having the AIGS/GaS structure, empty spaces where Ga or S are not bonded may be positioned on the surface. These empty spaces cause deterioration of efficiency.

FIG. 6 shows the quantum dots in which the first passivation layer including $In_2O_3$ is formed. Referring to FIG. 6, it may be confirmed that the empty space of the quantum dots surface is filled by the $In_2O_3$ structure. Therefore, the efficiency is increased.

Next, FIG. 7 shows the quantum dots in which the second passivation layer including $In(OAc)_3$ is formed. As shown in FIG. 7, $In(OAc)_3$ has an organic ligand while further filling the empty space of the quantum dots surface. Therefore, the luminous efficiency of the quantum dots may be increased.

In the present disclosure, when particles are spherical, "diameter" indicates a particle diameter or an average particle diameter, and when the particles are non-spherical, the "diameter" indicates a major axis length or an average major axis length.

The diameter of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter is referred to as D50. D50 refers to the average diameter of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

The display device, the quantum dot manufacturing device and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

While this present disclosure has been described in connection with what is presently considered to be practical embodiments, it is to be understood that the present disclosure is not limited to the disclosed embodiments. In contrast, it is intended to cover one or more suitable modifications and equivalent arrangements included within the spirit and scope of the appended claims and equivalents thereof.

What is claimed is:

1. A quantum dot comprising:

a core;

a shell around the core;

a first passivation layer, wherein the first passivation layer is in the form of a continuous spherical layer surrounding an entirety of the shell; and a second passivation layer, wherein the second passivation layer is in the form of a continuous spherical layer surrounding an entirety of the first passivation layer, wherein the first passivation layer comprises a an oxide of at least one metal among In, Ga, Al, or Ti, the second passivation layer comprises a compound represented by $K'(OA')_n$, and K' is one selected from among In, Zn, Ga, and Mg, A' is selected from among Ac, H, i-Pr (isopropyl), and Bu (butyl), and n is 2 or 3.

2. The quantum dot of claim 1, wherein the core comprises a compound represented by A-B—X, A is one or more selected from among Ag, Cu, and Au, B is one or more selected from among In, Ga, and Al, and X is one or more selected from among S, Se, and Te.

3. The quantum dot of claim 1, wherein the shell comprises a compound represented by C'-Y', C' is one or more selected from among Ga, In, Zn, and Mg, Y' is one or more selected from S and Se.

4. The quantum dot of claim 1, wherein the core comprises AgInGaS.

5. The quantum dot of claim 4, wherein the shell comprises GaS.

6. The quantum dot of claim 5, wherein the first passivation layer comprises $In_2O_3$.

7. The quantum dot of claim 6, wherein the second passivation layer comprises $In(OAc)_3$.

8. The quantum dot of claim 1, wherein the first passivation layer is positioned closer to the shell than the second passivation layer.

9. The quantum dot of claim 1, wherein the core comprises AgInGaS, wherein the shell comprises GaS, wherein the first passivation layer comprises $In_2O_3$, and wherein the second passivation layer comprises $In(OAc)_3$.

* * * * *